United States Patent
Ohishi et al.

(10) Patent No.: US 7,171,569 B2
(45) Date of Patent: Jan. 30, 2007

(54) APPARATUS, METHOD AND PROGRAM PRODUCT FOR PREVENTING SYSTEM MODE CHANGE BY MISTAKEN INSTRUCTION

(75) Inventors: Shinji Ohishi, Yamato (JP); Akiyoshi Tanaka, Sagamihara (JP); Noritoshi Yoshiyama, Yokohama (JP)

(73) Assignee: Lenovo Singapore Pte, Ltd., Singapore (SG)

( * ) Notice: Subject to any disclaimer, the term of this patent is extended or adjusted under 35 U.S.C. 154(b) by 430 days.

(21) Appl. No.: 10/739,508

(22) Filed: Dec. 18, 2003

(65) Prior Publication Data

US 2004/0243862 A1    Dec. 2, 2004

(30) Foreign Application Priority Data

Jun. 2, 2003    (JP)    ............................. 2003-156367

(51) Int. Cl.
  G06F 1/00    (2006.01)
  G06F 1/32    (2006.01)

(52) U.S. Cl. ........................ 713/300; 713/310; 713/320

(58) Field of Classification Search ................ 713/300, 713/310, 320; 708/131
See application file for complete search history.

(56) References Cited

U.S. PATENT DOCUMENTS 5,404,321 A * 4/1995 Mattox ........................ 708/131
5,710,986 A * 1/1998 Obayashi et al. ........ 455/553.1
5,754,798 A * 5/1998 Uehara et al. ............... 710/104
6,125,449 A * 9/2000 Taylor et al. ................ 713/310
6,803,728 B2 * 10/2004 Balasubramaniam et al. .... 315/149

FOREIGN PATENT DOCUMENTS

JP    01298425 A  * 12/1989
JP    03085619 A  *  4/1991

* cited by examiner

Primary Examiner—Thomas Lee
Assistant Examiner—Suresh K Suryawanshi
(74) Attorney, Agent, or Firm—Kunzler & Associates; Carlos Munoz-Bustamante

(57) ABSTRACT

An information processing apparatus that allows the operating mode of a system to be changed according to the input of a user instruction includes a request signal obtaining module for obtaining a change request signal for requesting the change of the operating mode of the system; an instruction signal generation module for generating a change instruction signal for changing the operating mode of the system according to the change request signal obtained by the request signal obtaining module; an operation control module for changing the operating mode of the system according to the change instruction signal generated by the instruction signal generation module; and an instruction signal generation control module for preventing the instruction signal generation module from generating the change instruction signal if the request signal obtaining module re-obtains the same change request signal as the change request signal during a time period required for the operation control module to successfully change the operating mode of the system.

16 Claims, 4 Drawing Sheets

APPARATUS, METHOD AND PROGRAM PRODUCT FOR PREVENTING SYSTEM MODE CHANGE BY MISTAKEN INSTRUCTION

FIELD OF THE INVENTION

The present invention relates to information processing systems that change the operating mode of a system according to an instruction input by a user. In particular, the present invention relates to preventing a mode change caused by a mistakenly input instruction.

BACKGROUND OF THE INVENTION

Modern notebook, portable or other types of personal computers have a number of operating modes such as a normal operation mode in which power consumption is relatively high and a power-saving mode in which power consumption is relatively low. A user can place a notebook PC into a power-saving mode to save power of the notebook PC when the user wants to take a break. Such a notebook PC typically allows a user to perform a predetermined key entry to change the operating mode of the notebook PC according to the key entry, for example, see Japanese Published Unexamined Patent Application No. 8-272494

Operating systems of existing notebook personal computers change operating mode, by among other methods, responding to an instruction provided through a key input by a user. However, the operating mode may not be able to be changed immediately, depending on the operating state of a subsystem such as a device driver. In such a case, the user may assume mistakenly that the operating mode has not changed because the key input was not accepted and accordingly may re-enter the key input a number of times. As a result, the operating system changes the operating mode to a power-saving mode while storing or holding the extra instructions input by the user key entries. After the PC subsequently returns to its normal operation mode, it will re-enter the power-saving mode in response to the stored instructions. This phenomenon may also occur when the user attempts to start using the notebook PC and may give the user the impression that the availability of the notebook PC is significantly reduced, which in turn decreases customer satisfaction.

Therefore, an object of the present invention is to provide an information processing apparatus, method and program product for preventing mode changes caused by a mistakenly input instruction as described above. The object is achieved by the combination of features set forth in the independent claims herein. The dependent claims define preferable, specific embodiments of the present invention.

SUMMARY OF THE INVENTION

According to an aspect of the present invention, there is provided an information processing apparatus that allows the operating mode of a system to be changed according to the input of a user instruction, comprising: a request signal obtaining module for obtaining a change request signal for requesting the change of the operating mode of the system; an instruction signal generation module for generating a change instruction signal for changing the operating mode of the system according to the change request signal obtained by the request signal obtaining module; an operation control module for changing the operating mode of the system according to the change instruction signal generated by the instruction signal generation module; and an instruction signal generation control module for preventing the instruction signal generation module from generating the change instruction signal if the request signal obtaining module re-obtains the same change request signal as the change request signal during a period until time required for the operation control module to successfully change the operating mode of the system elapses.

The summary of the present invention provided above is not the complete description of the essential features of the present invention. Sub-combinations of the features are also included in the present invention.

BRIEF DESCRIPTION OF THE DRAWINGS

Other objects and advantages of the invention will become apparent upon reading the following detailed description and upon reference to the accompanying drawings in which.

DETAILED DESCRIPTION OF THE INVENTION

While the present invention will be described with respect to a particular embodiment of the present invention, the embodiment is not intended to limit the present invention defined in the claims and not all the combination of the features described with respect to the embodiment are essential to the solution according to the present invention.

Figure 1:
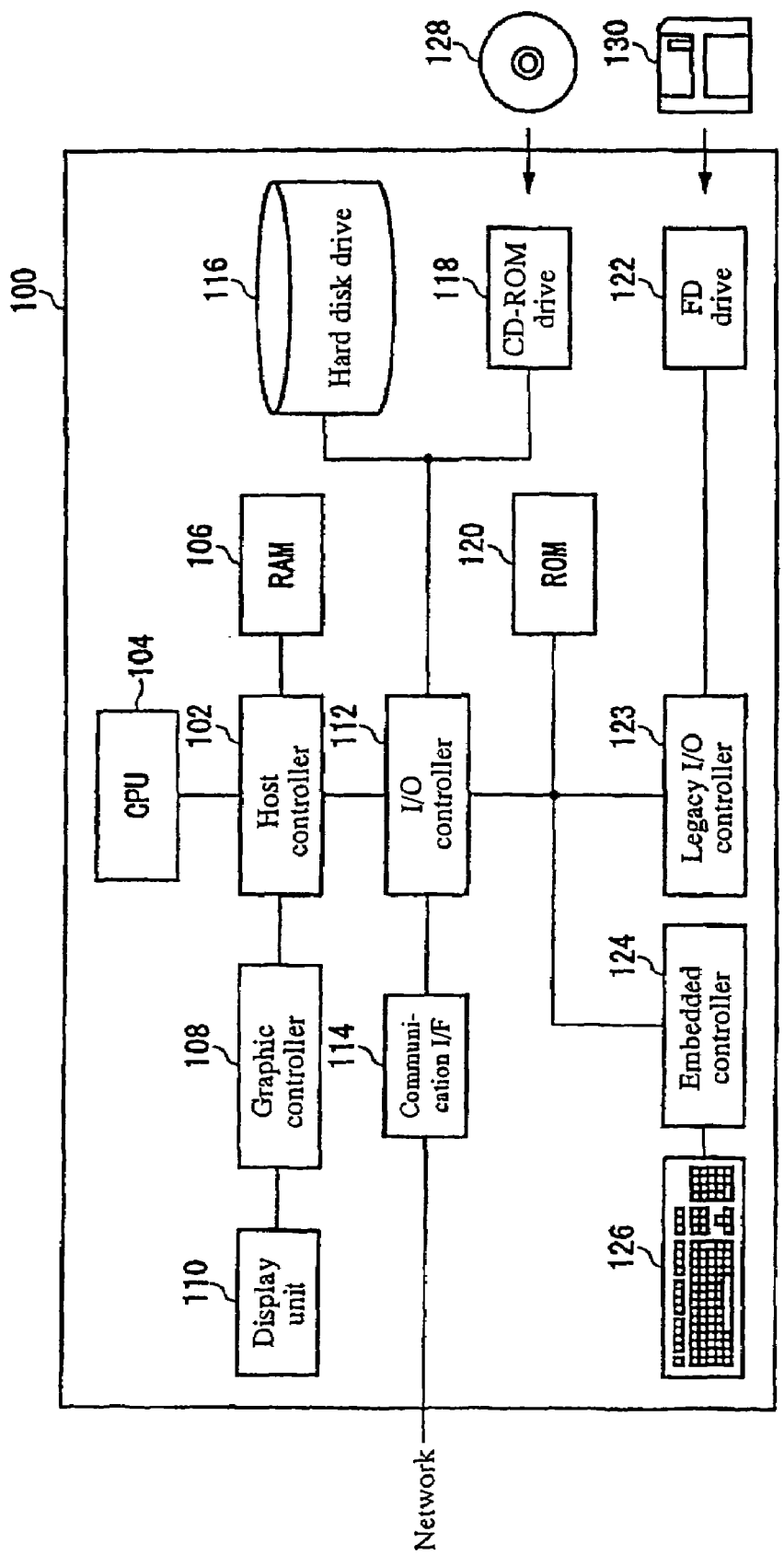
FIG. 1 shows an exemplary hardware configuration of an information processing apparatus according to the present invention.

FIG. 1 shows a block diagram of an exemplary hardware configuration of an information processing apparatus 100 according to a first embodiment of the present invention. The information processing apparatus 100 according to the present embodiment may be a notebook personal computer which changes the operating mode of a system such as a power management system from its normal operation mode to a power-saving mode such as a sleep mode, according to an instruction, which is input by a user and obtained through a keyboard 126 or other input device such as a mouse, keypad, touchscreen, etc. (not shown). If the operating mode of the system does not immediately change in response to the user-input instruction for some reasons such as an operating state of a subsystem such as a device driver or other components, the user, trying to change the operating mode of the system, may enter the instruction more than once, thereby providing more instructions than she or he has intended. In such a case, the information processing apparatus 100 according to the present invention can appropriately preclude the excessive instruction inputs and thus change the operating mode of the system just as intended by the user.

The information processing apparatus 100 comprises a CPU section including a CPU 104, a RAM 106, a graphic controller 108, and a display unit 110, which are interconnected through a host controller 102; an input/output section including a communication interface 114, a hard disk drive 116, and a CD-ROM drive 118, which are connected to the host controller 102 through an input/output controller 112; a legacy input/output section including a ROM 120, a flexible disk drive 122, a legacy input/output controller 123, and an embedded controller 124, which are connected to the input/output controller 112; and a keyboard 126 connected to the embedded controller 124. Other well-known components may also be included in the information processing apparatus 100, including other types of user interface/input devices, now known or later developed, which may be connected via the embedded controller 124.

The host controller 102 connects the CPU 104 and the graphic controller 108, which access the RAM 106 at high transfer rates, to the RAM 106. The CPU 104 operates according to programs stored in the RAM 106 and the ROM 120 to control the components. The CPU 104 also implements the functions of an operating system managing the operations of application programs. The graphic controller 108 obtains image data generated by the CPU 104 on a frame buffer provided in the RAM 106 and displays it on the display unit 110.

The input/output controller 112 connects the communication interface 114, the hard disk drive 116, and CD-ROM drive 118, which are relatively fast input/output devices, to the host controller 102. The communication interface 114 provides communication with other apparatuses over a network. The hard disk drive 116 stores programs and data used by the information processing apparatus 100. The CD-ROM drive 118 reads a program or data from a CD-ROM 128 and provides it to the CPU 104 through the RAM 106.

Connected to the input/output controller 112 are the ROM 120 and relatively low-speed input/output devices such as the flexible disk drive 122, and the embedded controller 124. The ROM 120 stores a boot program executed by the CPU 104 during starting up of the information processing apparatus 100 and programs that are dependent on hardware such as the embedded controller 124. The flexible disk drive 122 reads a program or data from a flexible disk 130 and provides it to the CPU 104 through the RAM 106.

Input/output devices such as the keyboard 126 are connected to the embedded controller 124. Input/output devices such as the flexible disk drive 122 are connected to the legacy input/output controller 123. The embedded controller 124 operates without using the functions of the operating system. Instead, it operates according to a program such as firmware stored in a non-volatile memory such as the ROM 120. The keyboard 126 includes internal buttons. Depression of each button is detected through matrix scanning to generate scan code information. Users may also enter information through other input devices connected to the embedded controller 124, as mentioned above, using methods appropriate for such devices. Any such types of inputs may be mapped to scan codes corresponding to keyboard key depressions. The embedded controller 124 sends a user request expressed by scan code information detected in the keyboard 126 to the operating system implemented by the CPU 104 through the host controller 102. The operating system supports ACPI (Advanced Configuration and Power Interface), for example, and manages power in the information processing apparatus 100.

The program implementing the operations of the embedded controller 124 includes a request signal obtaining module, an instruction signal generation module, an instruction signal generation control module, and an operating mode detection module. These modules constitute the program that causes the embedded controller 124 to function as a request signal obtaining module 200, an instruction signal generation module 202, an instruction signal generation control module 204, and an operating mode detection module 206 shown in FIG. 2.

Programs, such as the program that implement the operations of the embedded controller 124, to be provided to the information processing apparatus 100 are stored in a storage media such as a CD-ROM 128, a flexible disk 130, or an IC card and provided by the user. These programs are read from the storage media and installed in the ROM 120 or a ROM contained in the embedded controller 124 through the CPU 104 and executed.

The programs or modules described above may be stored in an external storage media. The storage media may be a CD-ROM 128 and a flexible disk 130 as well as an optical storage media such as a DVD or PD, a magneto-optical storage media such as an MD, a tape medium, or a semiconductor memory such as an IC card. Also, a storage device such as a hard disk or a RAM provided in a server system connected to a private communication network or the Internet may be used as a storage media to provide the programs to the information processing apparatus 100 through the network.

Figure 2:
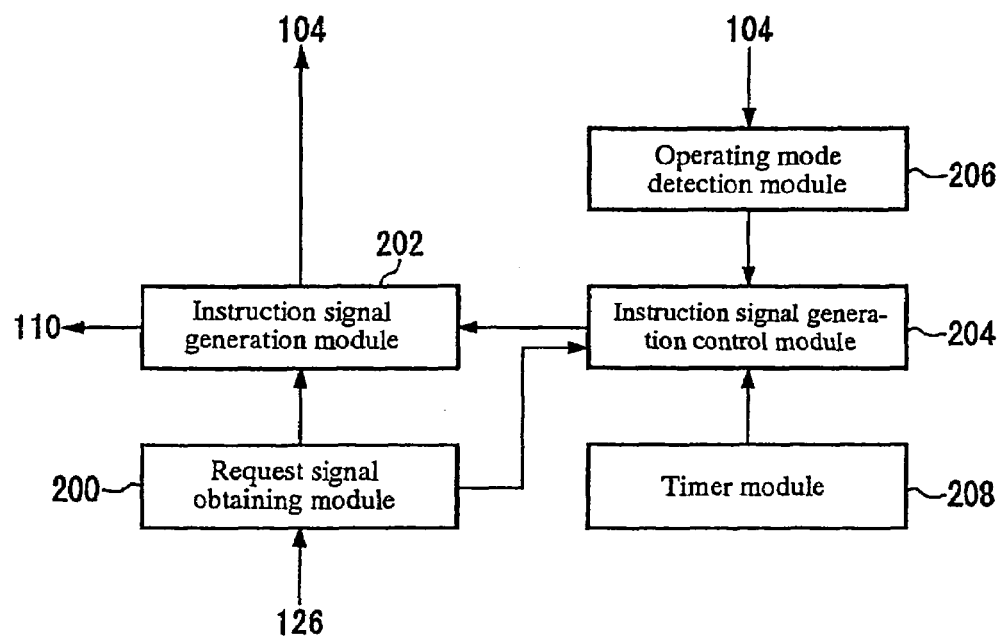
FIG. 2 shows an exemplary functional configuration of an embedded controller according to an embodiment of the present invention.

FIG. 2 shows an exemplary functional configuration of the embedded controller 124 according to the present embodiment. The embedded controller 124 comprises a request signal obtaining module 200 that obtains a request signal requesting to change the operating mode of the system of the information processing apparatus 100, an instruction signal generation module 202 that generates an instruction signal for changing the operating mode of the system according to the request signal obtained by the request signal obtaining module 200, an instruction signal generation control module 204 that controls generation of instruction signals by the instruction signal generation module 202, an operating mode detection module 206 that detects the operating mode of the system, and a timer module 208 that measures time used for the control by the instruction signal generation control module 204.

The request signal obtaining module 200 obtains scan code information generated by the user using the keyboard 126, or other input means, not shown. The instruction signal generation module 202 provides a system control interrupt (SCI) as a change instruction signal to the operating system according to the scan code information obtained by the request signal obtaining module 200. The operating system, which is an example of the operation control module of the present invention, receives the system control interrupt and changes the operating mode of the system.

The operating mode detection module 206 determines whether or not the operating mode of the system has successfully changed according to the system control interrupt issued from the instruction signal generation module 202 to the operating system. The operating mode detection module 206 notifies the instruction signal generation control module 204 of the result. The timer module 208 starts measuring time under the control of the instruction signal generation control module 204 and notifies the instruction signal generation control module 204 when a predetermined time has elapsed.

The instruction signal generation control module 204 prevents the instruction signal generation module 202 from successively issuing the same system control interrupt more than once. The instruction signal generation control module 204 may refer to a change of the operating mode of the system, which is indicated by the operating mode detection module 206, to control the issuance of the system control interrupt from the instruction signal generation module 202 or may refer to time measured by the timer module 208 to control the issuance of the system control interrupt provided from the instruction signal generation module 202.

If the instruction signal generation module 202 obtains from the request signal obtaining module 200 the scan code information corresponding to a system control interrupt that is prohibited by the instruction signal generation control module 204, the instruction signal generation module 202 generates an alert generating instruction signal on the basis of that scan code information and provides it to the display unit 110, which is an example of an alert generation module of the present invention. The display unit 110 displays the alert to the user instruction input according to the alert generating instruction signal obtained from the instruction signal generation module 202 to indicate to the user that he or she has performed erroneous input.

The information processing apparatus 100 may include an LED or speaker as the alert generation module of the present invention and the instruction signal generation module 202 may provide alert by lighting the LED or producing a beep. The instruction signal generation module 202 preferably provides the alert generating instruction signal directly to the alert generation module to cause it generate the alert without involvement of the operating system. This can reduce erroneous inputs by the user because alert can immediately be provided to the user even if the operating system cannot operate fast due to an operating state of a subsystem such as a device driver.

Figure 3:
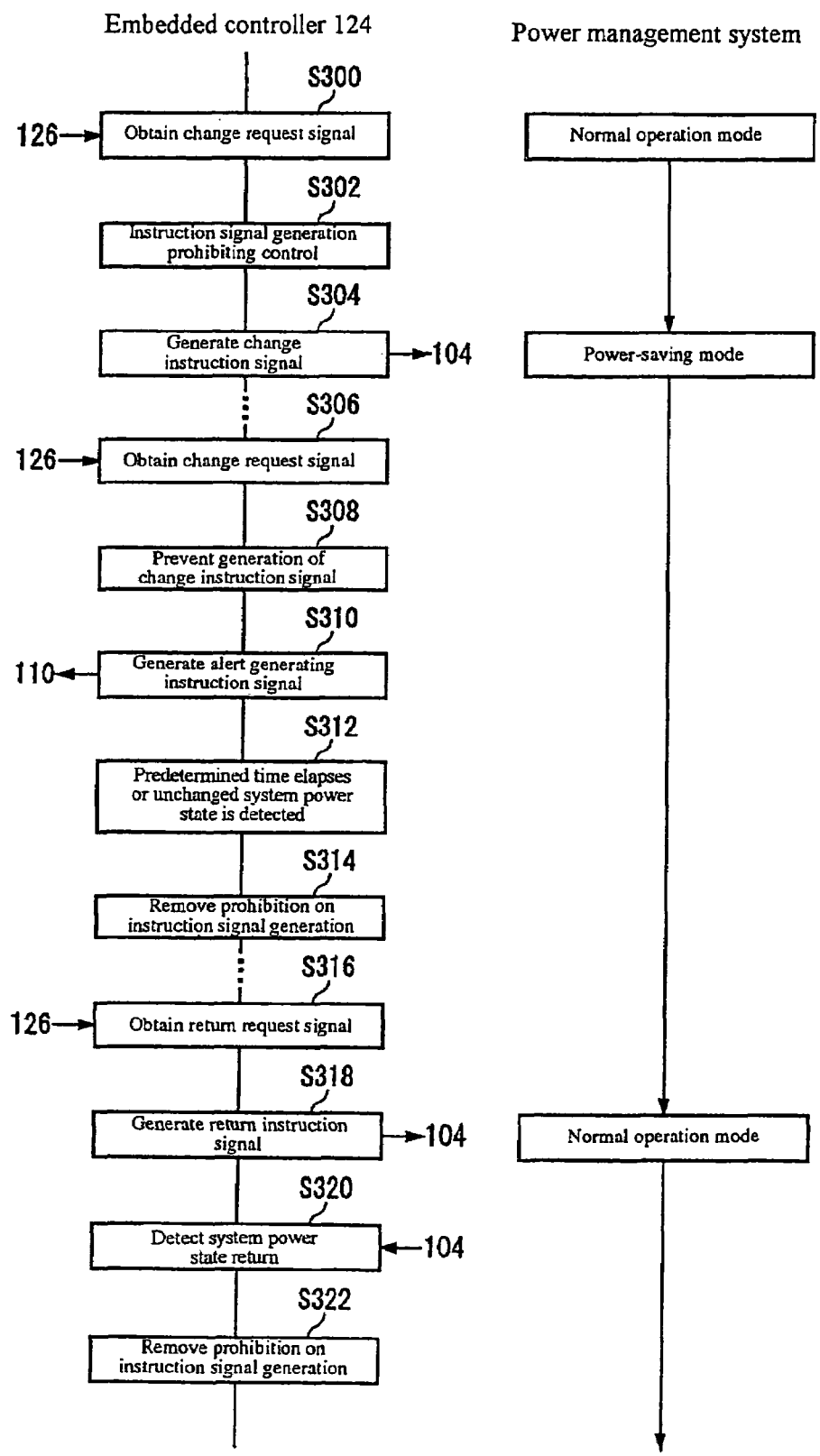
FIG. 3 shows an example of a process sequence performed in the embedded controller of FIG. 2.

FIG. 3 shows an example of a process sequence performed in the embedded controller 124 according to the present embodiment. The present process sequence is an example of a method for preventing mode change caused by a mistakenly input instruction according to the present invention. This process prevents the power management system from changing the system power state in response to an instruction mistakenly input by the user of the information processing apparatus 100 which changes the system power state according to user-input instructions.

In this example, the user enters different keys for changing the system power state from a normal operation mode to a power-saving mode and for changing the system power state from the power-saving mode to the normal operation mode. For example, to change the operating mode of the power management system from the normal operation mode to the power-saving mode, the user depresses a control key and a predefined function key simultaneously. This causes the scan code information corresponding to a change request signal to be sent from the keyboard 126 to the embedded controller 124. To return the operating mode of the power management system from the power-saving mode to the normal operation mode, the user depresses a control key and another function key simultaneously. This causes different scan code information, a return request signal, is sent from the keyboard 126 to the embedded controller 124. The different inputs requesting the two change request signals discussed above may alternatively be created by the user using an alternative input device connected through the embedded controller 124.

When the user performs a predetermined key entry through the keyboard 126, or other input device, not shown, in order to change the system power state from the normal operation mode to the power-saving mode, the request signal obtaining module 200 in the embedded controller 124 obtains from the input device a change request signal requesting to change the operating mode of the power management system (S300). Once the request signal obtaining module 200 obtains the change request signal, the instruction signal generation control module 204 controls the instruction signal generation module 202 to prevent it from generating a change instruction signal if the request signal obtaining module 200 re-obtains the same change request signal that it has obtained previously (S302). The instruction signal generation module 202 generates the change instruction signal for changing the system power state according to the change request signal obtained by the request signal obtaining module 200 and provides the change instruction signal to the operating system implemented by the CPU 104 (S304). The operating system changes the system power state to the power-saving mode according to the change instruction signal generated by the instruction signal generation module 202.

If the request signal obtaining module 200 re-obtains the same change request signal before the time required for successfully completing the process for changing the system power state by the operating system elapses (S306), the instruction signal generation control module 204 prevents the instruction signal generation module 202 from generating a change instruction signal in response to the same change request signal (S308). Moreover, if the request signal obtaining module 200 re-obtains the same change request signal while the instruction signal generation module 202 is being prevented by the instruction signal generation control module 204 from generating a change instruction signal (S306), the instruction signal generation module 202 generates an alert generating instruction signal, instead of a change instruction signal, according to the change request signal re-obtained by the request signal obtaining module 200 to cause the display unit 110 to display a message (S310).

The timer module 208 starts measuring time when the instruction signal generation module 202 generates a change instruction signal (S304). The timer module 208 may notify the instruction signal generation module 204 when a predetermined period of time required for the power management system to successfully change the system power state elapses. When the instruction signal generation module 204 is notified by the timer module 204 that the predetermined time has elapsed (S312), the instruction signal generation module 204 may remove the prohibition on change instruction signal generation by the instruction signal generation module 202 (S314).

Furthermore, the operating mode detection module 206 may detect and monitor the system power state during a predetermined period of time from generation of a change instruction signal by the instruction signal generation module 202 (S304). If the system power state has not changed to the power-saving mode (S312) when the predetermined time has elapsed since the instruction signal generation module 202 generated the change instruction signal (S304), the instruction signal generation control module 204 may remove the prohibition on change instruction signal generation by the instruction signal generation module 202 (S314).

Removing the prohibition on change instruction signal generation by the instruction signal generation module 202 allows the information processing apparatus 100 to accept a subsequent instruction input by the user if the operating system has failed to enter the power-saving mode or a user setting in the operating system has made the system power state unresponsive to a change instruction signal obtained by the request signal obtaining module 200.

When the user enters a predetermined key entry in the keyboard 126, or other input device, not shown, in order to change the system power state from the power-saving mode to the normal operating mode, the request signal obtaining module 200 in the embedded controller 124 obtains from the input device a return request signal for requesting to return the power management system to the previous operating mode (S316). When the request signal obtaining module 200 obtains the return request signal, the instruction signal generation module 202 generates a return instruction signal for returning the power management system to the previous system power state according to the return request signal obtained by the request signal obtaining module 200 and provides the return instruction signal to the operating system implemented by the CPU 104 (S318). Then, the operating system returns the system power state to the normal operation mode according to the return instruction signal generated by the instruction signal generation module 202.

The operating mode detection module 206 detects and monitors the system power state during a predetermined period of time from generation of a return instruction signal by the instruction signal generation module 202 (S318). When the operating mode detection module 206 detects that the system power state returns to the normal operation mode (S320), the instruction signal generation control module 204 removes the prohibition on change instruction signal generation by the instruction signal generation module 202 (S322). Then the instruction signal generation module 202 can generate a change instruction signal for changing the system power state according to the change request signal obtained by the request signal obtaining module 200 and change again the system power state to the power-saving mode.

In order to remove the prohibition on change instruction signal generation by the instruction signal generation module 202, the instruction signal generation control module 204 writes a flag indicating the removal in a predetermined storage area. Therefore, if the prohibition on change instruction signal generation by the instruction signal generation module 202 is removed by writing a flag indicating the removal in step S314 and then the prohibition on change instruction signal generation by the instruction signal generation module 202 is removed again in step S322, the flag written in the storage area is overwritten by the same flag.

As described above, if the request signal obtaining module 200 obtains the same change request signal more than once, the instruction signal generation control module 204 prevents generation of a change instruction signal based on the remaining change request signals after the instruction signal generation module 202 generates a change instruction signal according to the first change request signal. Therefore, even if the user mistakenly performs successive key entries in order to change the mode from normal operation mode to a power-saving mode and as a result the request signal obtaining module 200 obtains the same change request signal, only the required one change instruction signal is sent to the operating system without sending excessive change instruction signal. Consequently, the phenomenon can be avoided in which the operating system holds change instruction signals issued by key entries mistakenly performed by the user until after the operating system changes the operating mode to the power-saving mode. Thus, such phenomenon in which the operating system returns the mode to the normal operation mode and then changes again to the power-saving mode can be avoided.

Figure 4:
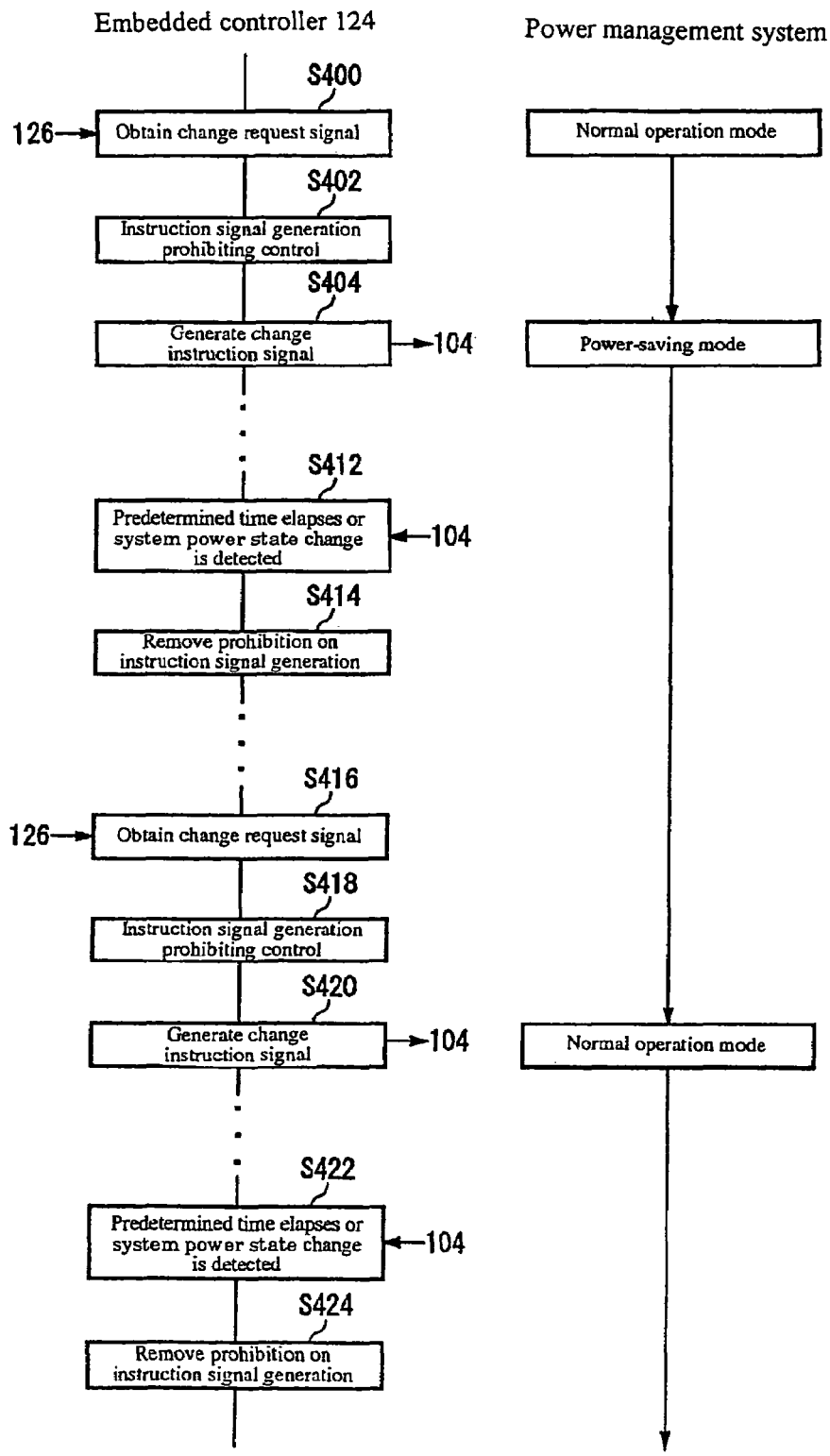
FIG. 4 shows another example of a process sequence performed in the embedded controller of FIG. 2.

FIG. 4 shows another example of a process sequence performed by the embedded controller 124 according to the present embodiment. The operation of the embedded controller 124 in this example is the same as that of the embedded controller 124 shown in FIG. 3, except the specifics that will be described below. Therefore the description of the same specifics as those in FIG. 3 will be omitted here.

In this example, a button such as a power button can be depressed to change the system power state from a normal operation mode, which is an example of a high-power-consuming high-system power state, to a power-saving mode, which is an example of low-power-consuming low-system power state, and the same button can be depressed to return the system power state from the power-saving mode to the normal operation mode.

When a user enters a predetermined key in the keyboard 126 in order to change the system power state from the normal operation mode to the power-saving mode, the request signal obtaining module 200 in the embedded controller 124 obtains from the keyboard 126 a change request signal for requesting to change the operating mode of the power management system (S400). Once the request signal obtaining module 200 obtains the change request signal, the instruction signal generation control module 204 controls the instruction signal generation module 202 to prevent the instruction signal generation module 202 from generating a change instruction signal if the request signal obtaining module 200 re-obtains the same change request signal that it has obtained previously (S402). The instruction signal generation module 202 generates a change instruction signal for changing the system power state according to the change request signal obtained by the request signal obtaining module 200 and provides it to the operating system implemented by the CPU 104 (S404).

If the system power state is the normal operation mode when the operating system received the change instruction signal, the operating system changes the system power state to the power-saving mode according to the change instruction signal generated by the instruction signal generation module 202. When the instruction signal generation module 204 is notified by the timer module 204 that a predetermined period of time has elapsed (S412), or the operating mode detection module 206 detects that the system power state changes to the power-saving mode (S412), the instruction signal generation control module 204 removes the prohibition on the change instruction signal generation by the instruction signal generation module 202 (S414).

Furthermore, when the user enters the predetermined key in the keyboard 126 in order to change the system power state from the power-saving mode to the normal operation mode, the request signal obtaining module 200 in the embedded controller 124 obtains from the keyboard 126 a change request signal for requesting the change of the operating mode of the power management system (S416). When the request signal obtaining module 200 obtains the change request signal, the instruction signal generation control module 204 controls the instruction signal generation module 202 to prevent the instruction signal generation module 202 from generating a change instruction signal if the request signal obtaining module 200 re-obtains the same change request signal that it has obtained previously (S418). Then the instruction signal generation module 202 generates a change instruction signal for changing the system power state according to the change request signal obtained by the request signal obtaining module 200 and provides it to the operating system implemented by the CPU 104 (S420).

If the system power state is the power-saving mode when the operating system receives the change instruction signal, the operating system changes the system power state to the normal operation mode according to the change instruction signal generated by the instruction signal generation module 202. When the instruction signal generation module 204 is notified by the timer module 204 that a predetermined period of time has elapsed (S422), or the operating mode detection module 206 detects that the system power state changes to the normal operation mode (S422), the instruction signal generation module 204 removes the prohibition on the change instruction signal generation by the instruction signal generation module 202 (S424).

As described above, if the request signal obtaining module 200 obtains the same change request signal more than once, the instruction signal generation control module 204 prevents generation of a change instruction signal based on the remaining change request signals after the instruction signal generation module 202 generates a change instruction signal according to the first change request signal. Therefore, even if the user mistakenly performs successive key entries in order to change the mode of the power management system and as a result the request signal obtaining module 200 obtains the same change request signal, only the required one change instruction signal is sent to the operating system without sending excessive change instruction signal.

The present invention has been described with respect to embodiments thereof, the technical scope of the present invention is not limited to the embodiments. Various changes or improvements can be made to the embodiments. It will be appreciated from the claims that embodiments to which such changes or improvements are made also fall in to the technical scope according to the present invention. For example, the operating mode of the system of the present invention has been described with respect to the system power state as an example. However, the operating mode of the system according to the present invention is not limited to the system power state. The present invention can be applied to the switching of the destination of an image drawn by a graphic controller 108 as well. In a case where the destination to which images are to be sent is switched between the display unit 110 of a notebook PC and an external display device such as a projector connected to the PC through a cable by a user performing a key entry through the keyboard 126, the method for preventing mode change caused by a mistakenly input instruction of the present invention can be used to prevent destination switching due to an instruction mistakenly input by a user. Thus, switching between destinations intended by the user can be provided.

According to the embodiments described above, there are provided an information processing apparatus, method and program product that prevent mode changes caused by mistakenly input instruction, as described below.

What is claimed is:

1. An information processing apparatus, comprising:
   a request signal obtaining module for obtaining from a user input instruction a change request signal for requesting a change of an operating mode of a computer system;
   an instruction signal generation module for generating a change instruction signal for changing the operating mode of said computer system according to said change request signal obtained by said request signal obtaining module;
   an operation control module for changing the operating mode of said computer system according to said change instruction signal generated by said instruction signal generation module; and an instruction signal generation control module for preventing said instruction signal generation module from generating said change instruction signal if said request signal obtaining module re-obtains the same change request signal as said change request signal during a time period required for said operation control module to successfully change the operating mode of said computer system.

2. The information processing apparatus according to claim 1, wherein the operating mode of said computer system comprises a system power state.

3. The information processing apparatus according to claim 2, further comprising an operating mode detection module for detecting said system power state, wherein:
   said request signal obtaining module obtains a return request signal for requesting to return the computer system to said system power state;
   said instruction signal generation module generates a return instruction signal for returning said computer system to said system power state according to said return request signal obtained by said request signal obtaining module;
   said operation control module returns said computer system to said system power state according to said return instruction signal generated by said instruction signal generation module; and
   said instruction signal generation control module removes the prevention of generation of said change instruction signal by said instruction signal generation module if said operating mode detection module detects that said computer system is returned to said system power state.

4. The information processing apparatus according to claim 1, further comprising an alert generation module for generating an alert to said user, wherein:
   if said request signal obtaining module re-obtains the same change request signal as said change request signal while said instruction signal generation control module is preventing said instruction signal generation module from generating said change instruction signal, then
   said instruction signal generation module generates an alert generating instruction signal different from said change instruction signal according to said change request signal re-obtained by said request signal obtaining module to cause said alert generation module to generate said alert.

5. The information processing apparatus according to claim 2, further comprising an operating mode detection module for detecting the system power state, wherein:
   said operation control module changes the system power state to a low-power-consuming low-system power state according to said change instruction signal if said request signal obtaining module obtains said change request signal while the system power state is a high-power-consuming high-system power state, or changes the system power state to said high-system power state according to said change instruction signal if said request signal obtaining module obtains said change request signal while the system power state is said low-system power state; and
   said instruction signal generation control module prevents said instruction signal generation module from generating said change instruction signal if said request signal obtaining module obtains said change request signal, and removes the prevention of generation of said change instruction signal by said instruction signal generation module if said operating mode detection module detects that the system power state is changed.

6. A method, comprising:
obtaining from a user input instruction a change request signal for requesting a change of an operating mode of a computer system;
generating a change instruction signal for changing the operating mode of said computer system according to said change request signal;
changing the operating mode of said computer system according to said change instruction signal; and
preventing generation of said change instruction signal if the same change request signal as said change request signal is re-obtained during a time period required for successfully changing the operating mode of said computer system.

7. The method according to claim 6, wherein the operating mode of said computer system comprises a system power state.

8. The method according to claim 6, further comprising:
if the change request signal is re-obtained during a time when the generation of the change instruction signal is being prevented, generating an alert to the user.

9. The method according to claim 7, further comprising:
detecting the system power state, and
changing the system power state to a low-power-consuming low-system power state if said change request signal is obtained while the system power state is a high-power-consuming high-system power state, or
changing the system power state to said high-system power state if said change request signal is obtained while the system power state is said low-system power state.

10. A computer program product comprising computer-readable instructions effective when executing on an information processing apparatus to function as:
a request signal obtaining module for obtaining from a user input instruction a change request signal for requesting a change of an operating mode of a computer system;
an instruction signal generation module for generating a change instruction signal for changing the operating mode of said computer system according to said change request signal obtained by said request signal obtaining module;
an operation control module for changing the operating mode of said computer system according to said change instruction signal generated by said instruction signal generation module; and
an instruction signal generation control module for preventing said instruction signal generation module from generating said change instruction signal if said request signal obtaining module re-obtains the same change request signal as said change request signal during a time period required for said operation control module to successfully change the operating mode of said computer system.

11. The computer program product according to claim 10, wherein the operating mode of said computer system comprises a system power state.

12. The computer program product according to claim 10 wherein the computer-readable instructions are effective when executing on an information processing apparatus to further function as an alert generation module for generating an alert to said user, wherein:
if said request signal obtaining module re-obtains the same change request signal as said change request signal while said instruction signal generation control module is preventing said instruction signal generation module from generating said change instruction signal, then
said instruction signal generation module generates an alert generating instruction signal different from said change instruction signal according to said change request signal re-obtained by said request signal obtaining module to cause said alert generation module to generate said alert.

13. The computer program product according to claim 11 wherein the computer-readable instructions are effective when executing on an information processing apparatus to further function as an operating mode detection module for detecting the system power state, wherein:
said operation control module changes the system power state to a low-power-consuming low-system power state according to said change instruction signal if said request signal obtaining module obtains said change request signal while the system power state is a high-power-consuming high-system power state, or changes the system power state to said high-system power state according to said change instruction signal if said request signal obtaining module obtains said change request signal while the system power state is said low-system power state.

14. The information processing apparatus according to claim 1, wherein the request signal obtaining module obtains the user input instruction from one of a computer keyboard stroke, a touch screen touch, and a computer mouse click.

15. The method according to claim 6, wherein obtaining from a user input instruction a change request signal further comprises obtaining the change request signal from one of a computer keyboard, a touch screen touch, and a computer mouse click.

16. The computer program product according to claim 10, wherein the request signal obtaining module obtains the user input instruction from one of a computer keyboard stroke, a touch screen touch, and a computer mouse click.

* * * * *